United States Patent
Rath et al.

(10) Patent No.: US 11,762,564 B2
(45) Date of Patent: Sep. 19, 2023

(54) SYSTEM AND METHOD FOR DETECTING CORRUPTION OF A DEDUPLICATED CLOUD OBJECT

(71) Applicant: EMC IP Holding Company LLC, Hopkinton, MA (US)

(72) Inventors: Jagannathdas Rath, Bangalore (IN); Kalyan C. Gunda, Bangalore (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 17/073,667

(22) Filed: Oct. 19, 2020

(65) Prior Publication Data
US 2022/0121376 A1 Apr. 21, 2022

(51) Int. Cl.
*G06F 3/06* (2006.01)

(52) U.S. Cl.
CPC ............ *G06F 3/0619* (2013.01); *G06F 3/067* (2013.01); *G06F 3/0641* (2013.01); *G06F 3/0652* (2013.01); *G06F 3/0653* (2013.01); *G06F 3/0659* (2013.01)

(58) Field of Classification Search
CPC .... G06F 3/0619; G06F 3/0641; G06F 3/0652; G06F 3/0653; G06F 3/0659; G06F 3/067
See application file for complete search history.

(56) References Cited

U.S. PATENT DOCUMENTS

| | | | | |
|---|---|---|---|---|
| 5,519,844 | A * | 5/1996 | Stallmo | G06F 11/1076 714/E11.034 |
| 6,256,760 | B1 * | 7/2001 | Carron | G01R 31/31919 714/736 |
| 10,354,736 | B1 * | 7/2019 | Yang | G11C 16/14 |
| 2002/0169995 | A1 * | 11/2002 | Archibald, Jr. | G06F 11/1076 714/6.12 |
| 2007/0038682 | A1 * | 2/2007 | Kulesza | G06F 11/1469 714/E11.122 |
| 2014/0281784 | A1 * | 9/2014 | Verma | G06F 11/1092 714/752 |
| 2017/0220406 | A1 * | 8/2017 | Parnell | G06F 11/14 |
| 2017/0286362 | A1 * | 10/2017 | Friedman | H04L 67/568 |
| 2018/0293139 | A1 * | 10/2018 | Defiebre | G06F 16/24554 |

* cited by examiner

*Primary Examiner* — Arpan P. Savla
*Assistant Examiner* — Eric T Loonan
(74) *Attorney, Agent, or Firm* — WOMBLE BOND DICKINSON (US) LLP

(57) ABSTRACT

A method of detecting object corruption of deduplicated cloud objects includes a two-layered approach. In a first layer, only metadata areas from segments of a deduplicated cloud object are processed in order to detect corruptions in the metadata. If no corruption is detected in the metadata, a second layer analysis can be performed. The second layer analysis includes a progressive scanning of data only on objects that were not found to be corrupted in the first layer analysis.

20 Claims, 7 Drawing Sheets

| Cloud Object 1 | | |
|---|---|---|
| Seg. 1 | Segment 1<br>Meta Area 1<br>Data Area 1 | A<br>r<br>e<br>a<br>1 |
| Seg. 2 | Segment 2<br>Meta Area 2<br>Data Area 2 | |
| | ............ | |
| Seg. X | Segment 1<br>Meta Area 1<br>Data Area 1 | A<br>r<br>e<br>a<br>2 |
| Seg. X+1 | Segment 2<br>Meta Area 2<br>Data Area 2 | |
| | ............ | |
| Seg. N-m | Segment 1<br>Meta Area 1<br>Data Area 1 | A<br>r<br>e<br>a<br>3 |
| Seg. N-m+1 | Segment 2<br>Meta Area 2<br>Data Area 2 | |
| Seg. N | ............ | |

| Cloud Object 2 | | |
|---|---|---|
| Seg. 1 | Segment 1<br>Meta Area 1<br>Data Area 1 | A<br>r<br>e<br>a<br>1 |
| Seg. 2 | Segment 2<br>Meta Area 2<br>Data Area 2 | |
| | ............ | |
| Seg. X | Segment 1<br>Meta Area 1<br>Data Area 1 | A<br>r<br>e<br>a<br>2 |
| Seg. X+1 | Segment 2<br>Meta Area 2<br>Data Area 2 | |
| | ............ | |
| Seg. N-m | Segment 1<br>Meta Area 1<br>Data Area 1 | A<br>r<br>e<br>a<br>3 |
| Seg. N-m+1 | Segment 2<br>Meta Area 2<br>Data Area 2 | |
| Seg. N | ............ | |

SYSTEM AND METHOD FOR DETECTING CORRUPTION OF A DEDUPLICATED CLOUD OBJECT

FIELD OF THE INVENTION

Embodiments of the present invention relate generally to techniques for detecting corruption within a storage system in an efficient manner. More particularly, embodiments of the invention provide a system and method for detecting object corruption within a deduplicated storage system in an efficient manner.

BACKGROUND

Cloud storage has become very common for direct backups as well as for deduplication applications to store the deduplicated data off-premises, for various use cases like long term retention and DR etc. In a deduplicated storage system, a file is split into segments and these segments are deduplicated across all files in the system. The segments are packed as compressed and sometimes encrypted regions within containers which are represented as objects in cloud. The size of these objects might vary (for ex. 1 MB-16 MB, with an average segment size of 8 KB-128 KB) depending on how many segments they contain.

BRIEF DESCRIPTION OF THE DRAWINGS

Embodiments of the invention are illustrated by way of example and not limitation in the figures of the accompanying drawings in which like references indicate similar elements.

FIG. 4 is a diagram illustrating example cloud objects with segment areas, according to an embodiment.

FIG. 5 is a diagram illustrating an example metadata processing technique, according to an embodiment.

DETAILED DESCRIPTION

Figure 1:
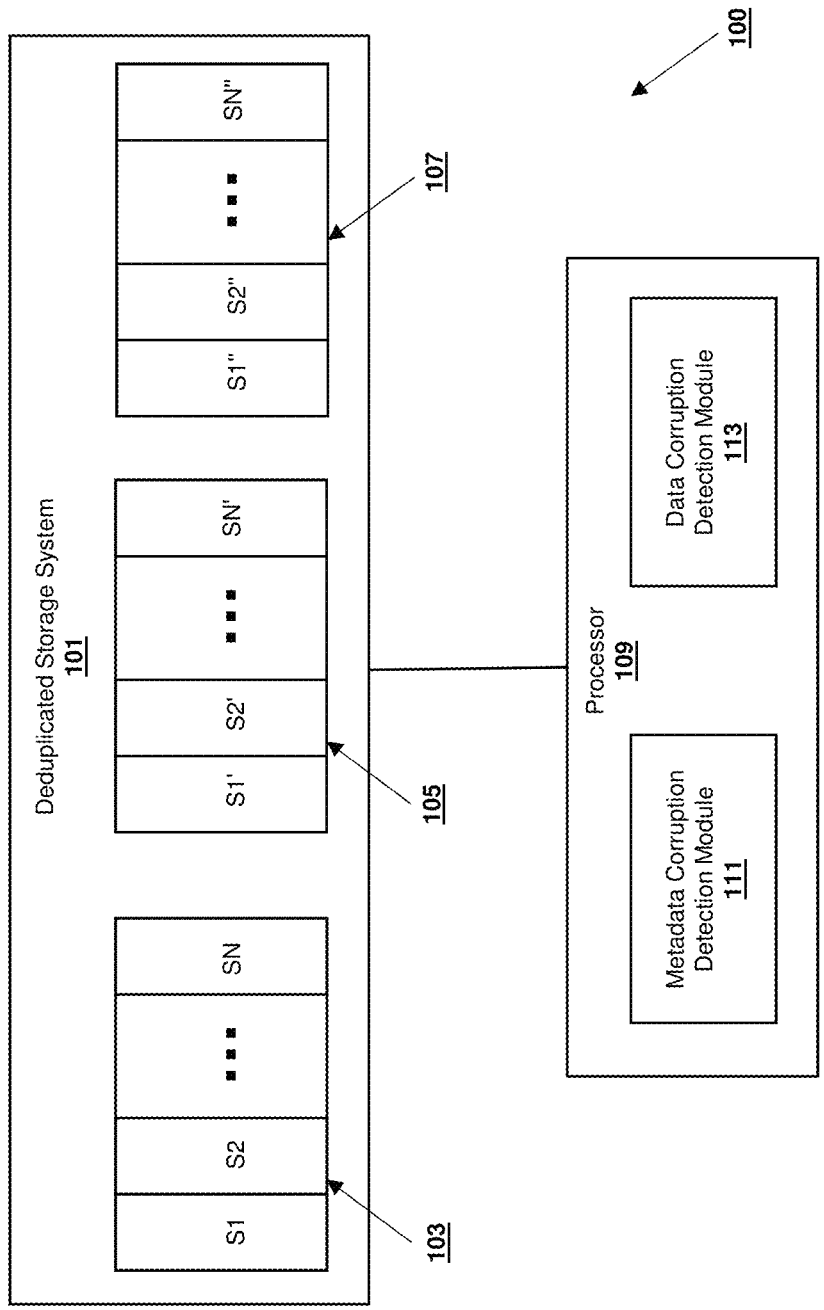
FIG. 1 is a block diagram illustrating an example system 100 for detecting object corruption, according to an embodiment.

Embodiments described herein disclose a computer implemented method of detecting object corruption within a deduplicated cloud object. Deduplicated (deduped) applications can have multiple policies for determining when and which objects to move to the cloud. Over time, the number of deduped objects in the cloud increases over time, starting from a few thousand, to millions, to multiple billions, and even more. Many times, various reasons like software bugs, hardware issues, bad disk sectors, disk failures etc. in the cloud provider's end can leads to silent data corruption of these cloud objects, either wholly of partially. Data corruptions in deduped data is a much bigger problem, as one object corruption might affect hundreds or thousands of deduped files sharing the segments within the object It's very easy to deal with all kinds of file corruptions when the data is on-premises. But the moment data is moved to the cloud, hardly anything can be done other than to detect the corruption pro-actively and take possible corrective measures. No dedupe app providers currently have a publicized mechanism to detect cloud data corruption.

For example, various dedupe application providers do not have a mechanism to scan the data already moved to the cloud. (either in GUI or CLI). Some providers even recommend to rollback cloud volumes to older snapshots (if any) to recover to a sane state. Some current products can perform a continuous background scan for corruption only for the on-premises data that is stored on local disks by the app, and not for cloud data. It is very clear that an efficient mechanism does not yet exist.

This disclosure proposes a complete solution model with an efficient method for any deduped system to be able to provide cloud data integrity validation as a viable and exposed feature in its offerings. Customers won't have to depend on support teams to validate their deduped cloud data. With this disclosure, administrators and end-users are provided an efficient, easy and on-demand data verification method for the deduped data in the cloud.

A few examples of corruptions which are seen or can been seen in private/public cloud providers include: PUT API succeeds, and list shows the object, but a GET returns an error; due to metadata issue at cloud provider, a GET returns an object full of zeros random corruptions inside an object (full object or parts of it); object consolidation APIs from cloud provider having bugs/issues where partial object is corrupted and full of zeros or non-zeroes as well; a multipart upload having a bug on cloud provider and corrupts a single put/object in multipart large object; multi-copy API of cloud providers corrupting the data; when migrating data from provider1 to provider2 using open source tools, a corruption can be carried from provider1 to provider2. In this last example, provider2 thinks it has all good data and its checksum is now based on this corrupted data, so checksums from provider2 can't be relied upon.

Traditional approaches followed to detect such corruptions in the cloud objects can include: reading each object from the cloud (full object); and performing validations for each segment within the object. Example validations can include: validating the segment meta; validating the encryption meta, if any; validating the compression meta, if any; validating overall object meta, if any; decrypting each segment, if encrypted; decompressing each the segment, if compressed; validating the segment data by some method like checksum or fingerprinting; and any other validations as deemed necessary by the dedupe system.

Performing these validations for 1 billion objects in the cloud, assuming a cloud container object size of 4 MB, would require reading 3814 TB worth of data to be read from the cloud. This could take many months to complete, even on a 1 Gbps network connection and even with a multi-threaded approach. Also, public cloud providers charge for reading the objects (egress costs). So, reading 3814 TB at an optimal cost of say $0.05/GB would accrue close to $200K. That's a huge cost for each run of data integrity checks for deduped data moved to the cloud. And this is a process which is expected to run at some frequency to ensure data integrity and correctness (if not run pro-actively, then the corruption will only be detected when the data is recalled from the cloud to on-premises, to restore a backup). This disclosure provides a more efficient 2-layered data corruption detection method to solve the above problems.

According to one embodiment, a 2-layered approach is disclosed to detect data corruption in each object as early as possible while reading the least possible amount of data from the cloud.

A first layer, or a fast method, can read only the metadata areas of the segments in an object, in a well-defined manner, and scan for corruptions in those areas. For any dedupe system, the metadata would occupy relatively much less space as compared to the data (e.g. 0.1-1% of the total size of objects). For a corrupted cloud object, the probability of these meta areas also being corrupt is very high. So, this method will detect almost all such corrupt objects by just reading a fraction of the object size. Most of the corruptions will be caught here by simply scanning or processing the metadata.

A second layer, or a progressive method, is a deeper detection method and can be executed only on the objects which were found to be non-corrupted in the fast method. This second progressive method can read the data areas as well. But the key here is, it will not read the whole object at once, but will read each of its segments in a progressive manner i.e. few segments at a time based on transaction cost etc. and stop reading when the first corruption is detected in any of the segments within an object. Again, this method also will try to detect all such corrupt objects by just reading the least possible areas of the object.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the description of the embodiments provided herein, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

System Overview

FIG. 1 is a block diagram illustrating an example system 100 for detecting object corruption, according to an embodiment. In this embodiment, the system 100 includes a deduplicated storage system 101, which includes a number of objects 103, 105, 107. Each of these objects is divided into a series of segments S1-SN, S1'-SN', and S1"-SN", respectively. The system 100 also includes a processor 109, which includes a metadata corruption detection module 111 and a data corruption detection module 113, in this particular embodiment.

In one embodiment, all deduped systems store each segments in a specific layout. An example layout of each of the segments can include meta, encryption meta, compression meta, data areas, object meta, etc. The meta information can be very small in size, as compared to the data areas of the segments. In one of the objects 103, 105, 107 gets corrupted, then there is a very high probability that the meta area of at least one of its segments is also corrupted by at least one byte. According to one embodiment, the metadata corruption detection module 111 can take advantage of this aspect ratio and validate only the meta areas of each segment, a few segments at a time, and in an optimal way. If any corruption is found in any of the segments, then the object can be declared corrupted and no further processing is needed. The remaining meta areas or any data area in the object will not need to be read anymore. In one embodiment, the metadata corruption detection module 111 can scan the metadata segments in a progressive manner, by dividing the segments within each object into logical areas with equal numbers of segments.

In one embodiment, the segments S1-SN can also be read in a progressive or coverage based approach. For example, the metadata corruption detection module 111 can divide the first object 103 into a number of equally sized areas, and the first segment of each area can be scanned together in a first round. If no corruption is detected, the second segment of each area can be scanned in a second round. This can be performed until a corruption is detected, or until each of the segments within the object is scanned. The benefit of this being that different areas of the object are scanned at once (e.g. beginning, middle and towards end) thereby increasing the probability of hitting a corruption (if any) at the earliest.

There will be occasions where none of the meta areas are corrupted, but one or more bytes in the remaining encrypted/compressed data areas are corrupted. In such cases, the data corruption detection module 113 performs a deeper processing and will read and validate each segment, both the data and the metadata, again a few segments at a time. The data corruption detection module 113 can perform a multi-threaded process. The object can be declared invalid the moment a segment is found to be corrupt, and the entire processing and scanning of all the remaining data within each object is avoided. The data corruption detection module 113 can also perform the scanning in the progressive, or coverage based scanning model, discussed above. The model can define the order in which the segments within each object will be read, as well as the number of segments that will be read in one cloud transaction. In some embodiments, all segments from a single object are read and processed using the same thread.

This disclosure favors issuing multiple requests to read an object instead of reading it at one shot. This approach provides a greater control on the amount of cloud data to read and also provides multiple opportunities to detect a corruption as early as possible and thus decrease the total amount of cloud i/o. (also transaction costs are much lesser than data egress costs).

In some embodiments (where a good amount of corrupt objects is present), the proposed methods will definitely reduce the total cloud i/o and the execution time drastically (e.g. from many months to a few months or days). That itself would be a huge improvement for any dedupe app to detect any corruption in its cloud objects. The worst case scenario for this method is when none of the objects are corrupted. In that case, the execution time would be almost the same as the traditional approach. In some embodiments, the fast method (scanning only metadata) can be run independently for a quick detection, as a light weight tool, and the progressive method may be executed only when corruptions are found in the fast method. This can ensure certain corruptions, like full object corruptions, can be detected quickly. The expectation is that full object corruptions are seen more often than a byte or few bytes corruption in an object, hence this fast method would suffice in most cases.

Example operations of the processor 109, the metadata corruption detection module 111, and the data corruption detection module 113 are discussed in more detail below with respect to FIGS. 2-3.

Note that some or all of the components as shown and described may be implemented in software, hardware, or a combination thereof. For example, such components can be implemented as software installed and stored in a persistent storage device, which can be loaded and executed in a memory by one or more processors that, in response to instructions within the software, are configured to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
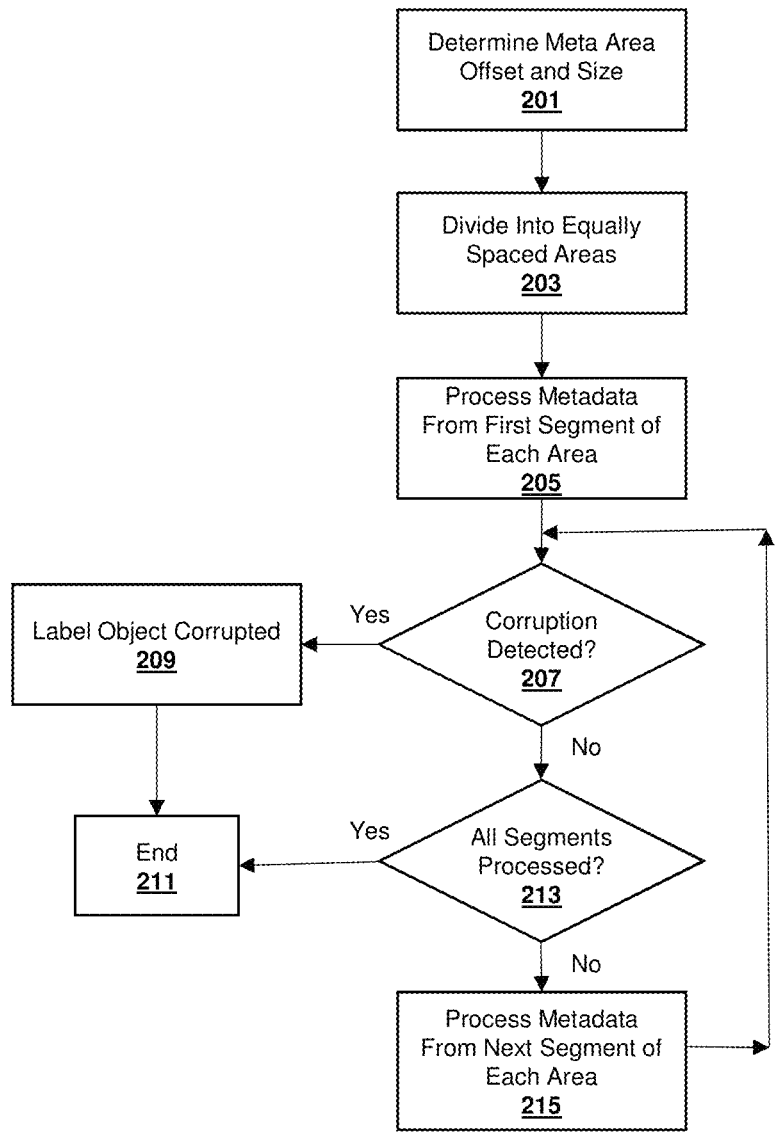
FIG. 2 is a flow diagram of an example process for detecting corruption in a deduplicated object, according to an embodiment.

FIG. 2 is a flow diagram of an example process for detecting corruption in a deduplicated object, according to an embodiment. The process can be executed, for example, by the metadata corruption detection module 111 in FIG. 1.

In operation 201, the offset and size of a meta area within an object is determined. In some embodiments, deduped appliances store the metadata locally as well as in the cloud mainly to provide faster dedupe, efficient garbage collection (GC) etc. and to reduce cost to contact cloud for these operations. Thus, determining the meta area offset and size, or mapping the meta area, can be done without needing to access the cloud, in some embodiments.

In one embodiment, the locally stored metadata for each object is retrieved to get the details of the object layout, its regions/sections/segments etc. (Ex. offset, length details of each segment within an object). One can also find out if the segments are compressed, encrypted, where are the compression or encryption meta stored, how the segment meta is stored, and if any object level meta exists etc. All these will vary as per the dedupe application's way of packing segments in objects.

Based on the above info, the method can determine the offset and size of the meta area within each segment in the object. For example, a dedupe app might be storing all the meta in the beginning of each segment itself, like: Offset: 0, len: 72 bytes. Within these 72 bytes, it might contain the compression meta, encryption meta etc. In some embodiments, I/O tuples can be created for each such segment, with info like <object id, seg offset, seg length, start and end offset of its meta areas, type i.e. whether segment meta or object meta>. Examples of I/O tuples are shown below in Table 1:

TABLE 1

| | | |
|---|---|---|
| <obj_id:1, seg_start:0, | seg_len:131072, moff_start:0, | moff_end:72, type:seg_meta> |
| <obj_id:1, seg_start:131072 | seg_len:131072, moff_start:131072, | moff_end:131144, type:seg_meta> |
| <obj_id:1, seg_start:0 | seg_len:0, moff_start:4194304, | moff_end:4718592 type:obj_meta> |

In some embodiments, the I/O tuples can be stored in an in-memory array, for ex: in format: <object_id, seg_start, seg_len, meta_offset_start, meta_offset_end, type>. All io tuples belonging to one object ID can be stored sequentially, so that they can be picked up easily later. To ensure that the method does not hog memory un-necessarily, segments within objects can be processed in batches (e.g. 10,000 or 1 Million segments in one batch). This can ensure that the in-memory buffer size remains small and fixed, even if there are billions of objects to scan. Once all segments are processed, the next batch will be refilled/prepared and processed and so on.

In operation 203, the segments within each object can be divided into areas, where each area has an equal number of segments. This division of segments into areas can be performed using the I/O tuples, in some embodiments.

In operation 205, a first round of metadata segments can be processed. In one embodiments, the first segment from each area, or grouping of segments, is processed at the same time. Once a batch of I/O tuples are ready, they will be processed by multiple threads in parallel to maximize the overall execution performance. Each thread will pick a set of segments belonging to one object at a time and process them as per coverage model, under proper locking & synchronization semantics.

In one embodiment, the I/O tuples created for the segments of one object should be processed by one thread only. The segments of one object cannot be processed by multiple threads in parallel, otherwise we will end up just reading the whole object (by parallel threads) by the time a corrupt segment is detected. The method will prevent such scenarios by ensuring that each thread picks the I/O tuples of all the segments of an object at one shot and processes them, and then picks the next set of all I/O tuples for another object. Similarly, a different thread will pick the I/O tuples of all segments that belong to another object and so on.

The threads can process the I/O tuples as per the coverage based scanning model, where, the cloud object is logically divided into a number of equally spaced areas, based on the segment indexes. In one embodiment, the object is divided into three equally sized areas, and segment1 from each area will be read at one shot. Then, the segment2 from each area will be read, and so on, three segments at a time.

For example, if the object contains 36 segments, then: the first area will be from segment no. 1-12, the second area will be from segment no. 13-24, and the third area will be from segment no. 25-36. The threads can process the segments in the following order: cloud transaction 1: {Area1:seg1, Area2:seg1, Area3:seg1}; cloud transaction 2: {Area1:seg2, Area2:seg2, Area3:seg2}; and so on until a corruption is detected or all are processed.

In some embodiments, if the dedupe system stores more than 50 segments in an object, then it can choose four or five segments at a time. This model ensures a uniform coverage of the objects and increases the probability of finding a corrupt segment (meta/data) much faster, while not increasing the cloud transactions by too much. The method can use the Cloud provider's "Range GET" functionality to read a range of bytes (set of <offset, len> will be given) instead of the full object length. This is supported by almost all public and private cloud providers. For example: {GET: Range: 0-72, 1000-1072, 2000-2072} would read only bytes 0-72, 1000-1072 and 2000-2072 in the object and not the whole object In operation 207, if a corruption is detected, the method can proceed to operation 209 and label the object as corrupted, and end the method at 211. If no corruption is detected in the first segments at operation 207, then the method can proceed to operation 213 to determine whether all segments within the object have yet been processed. If all the segments have been processed, the method can end at 211. If not all the segments have been processed, the method can proceed to operation 215 and process the next round of metadata segments.

In some embodiments, each thread can perform the cloud RANGE GET operation for each set of selected I/O tuples and read their meta areas. Once the data is fetched from the cloud, the validation of the meta can start. If none of them are invalid, then it can read the next set of I/O tuples, and so on until all of them are done or invalid meta is detected. Validating the meta would involve all types of basic verifications that can prove that the meta data is not corrupt by any chance. These can vary based on how and what the dedupe systems store in meta data of segments. Example verifications can include, but are not limited to: verify that the data read is not fully zero (fully zeroed out corruption); verify the segment header; verify the encryption metadata, if any; verify the compression metadata, if any. These verifications can be for things like magic numbers, checksums, encryption/decompression algorithm types, algorithm versions, counts, offsets and all such similar fields as per the dedupe system logic. An additional verification that can be performed may include verifying the object meta, if it exists. Any single verification failure implies the object is corrupted and would not need any further validation. The object can be marked as invalid (operation 209) and will not be scanned in the second layer. Even the pending I/O tuples for this object within the thread can all be cancelled, and the thread can pick up the next set of I/O tuples for the next object.

Figure 3:
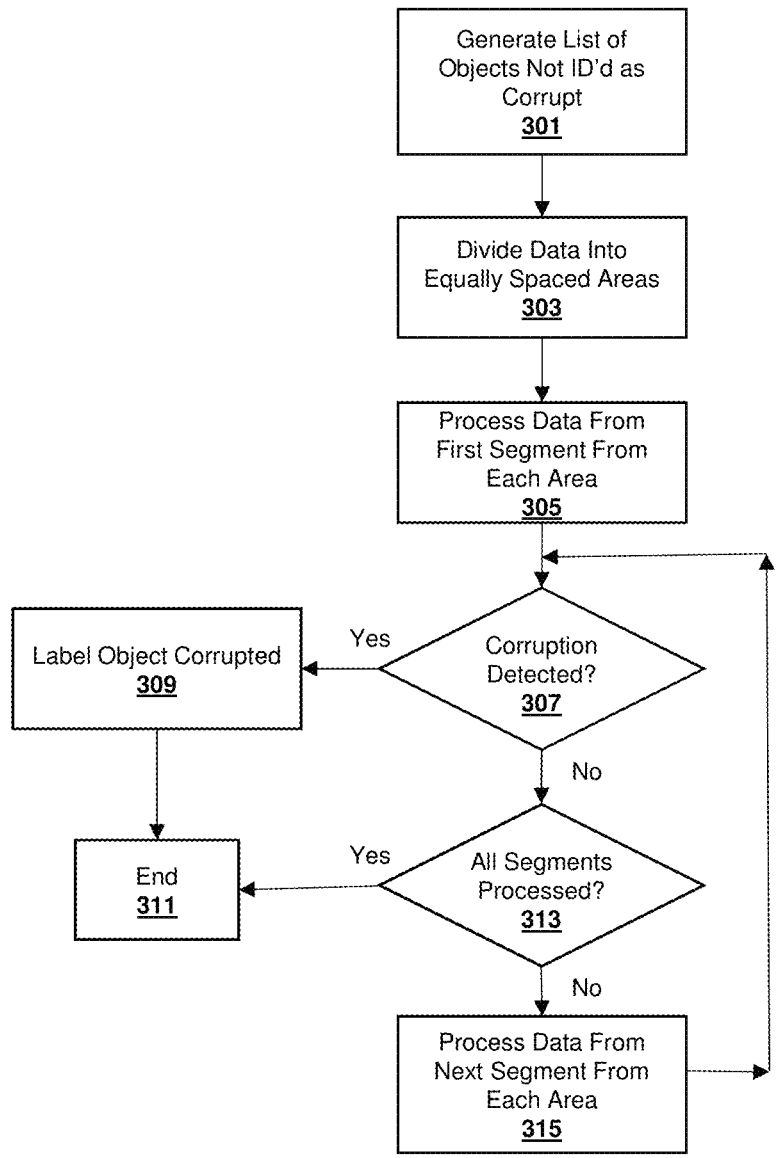
FIG. 3 is a flow diagram of an example process for detecting corruption in a deduplicated object, according to an embodiment.

FIG. 3 is a flow diagram of an example process for detecting corruption in a deduplicated object, according to an embodiment. The process can be executed, for example, by the data corruption detection module 113 in FIG. 1.

In some embodiments, if all the segments of the object are validated successfully according to the method of FIG. 2, then there might be still a very small chance that the data part of the segments (non-meta part) might be corrupted. So, this object will be marked for a much deeper second layer validation.

In operation 301, a list of all the objects that were not identified as corrupt based on the method of FIG. 2 is generated. This is the list of objects that can be processed in a deeper, second layer progressive analysis.

In operation 303, the segments within each object can be divided into areas, where each area has an equal number of segments. This division of segments into areas can be performed using the I/O tuples, in some embodiments.

In some embodiments, the method described in FIG. 2 can detect most of the corruptions, like fully/partially zeroed out objects and randomly corrupted objects (meta verification will fail for these), missing objects (meta read itself will fail) etc. This second layer (i.e. the progressive method) will be used to detect much deeper corruptions and can analyze entire segments, not just the metadata. Example corruptions that can be detected using this second layer analysis described in FIG. 3 include, but are not limited to: partially or fully corrupted bytes in the data areas of the segments, for which the segment first needs to be decrypted, decompressed and then the bytes validated. The corruption can be either on the encrypted data, or compressed data or, decompressed data.

In some embodiments, the method of FIG. 3 can include creating I/O tuples for each marked object in the in-memory bitmap (retrieved above in FIG. 2), by referring the dedupe application's local metadata. The tuples can contain, for example, <object_id, seg_start, seg_len> and can be created in batches, processed and refilled similarly. These would be full segments, including meta and data.

In operation 305, a first round of data segments can be processed. In one embodiments, the first segment from each area, or grouping of segments, is processed at the same time. Here also, the I/O tuples of the segments belonging to one object will not be processed by multiple threads in parallel. Each thread would pick all the I/O tuples belonging to one object only at a time and process them (e.g. three segments at a time).

In this method also, each thread can use the cloud provider's Range read GET api and read the set of whole segments (I/O tuple) at a time. Once these segments are fetched from the cloud, they would be then validated. If no corruption is detected, then the next set of segments will be fetched, and so on.

In one embodiment, a set of segment start and end offsets will be specified for the GET operation. For example: {GET: Range: 0-131072, 2097152-2228224, 4194304-4325376} would read the three segments of 128K each. Once the set of segments are fetched, the validation would be done for the data areas and it would involve things like, but not limited to: decrypting the segment, if encrypted; decompressing the segment, if compressed; validating the uncompressed data by checksums, fingerprints or both; any other dedupe app specific validation mechanism. If any of the above fails, then the object will be marked as invalid, and all the pending I/O tuples for this object, within the thread, can be cancelled and the thread can pick up the next set of I/O tuples for a different object.

In operation 307, if a corruption is detected, the method can proceed to operation 309 and label the object as corrupted, and end the method at 311. If no corruption is detected in the first data segments at operation 307, then the method can proceed to operation 313 to determine whether all segments within the object have yet been processed. If all the segments have been processed, the method can end at 311. If not all the segments have been processed, the method can proceed to operation 315 and process the next round of data segments.

FIG. 4 is a diagram illustrating example cloud objects with segment areas, according to one embodiment of the present disclosure. In this embodiment, two cloud objects are organized into three areas each. In the first cloud object, there are a total of N segments, and these segments are divided into three areas: area 1 includes segment 1, segment 2, etc.; area 2 includes segment X, segment X+1, etc.; and area 3 includes segment N-m, segment N-m+1, . . . and segment N. The second cloud object is likewise divided.

Figure 5:
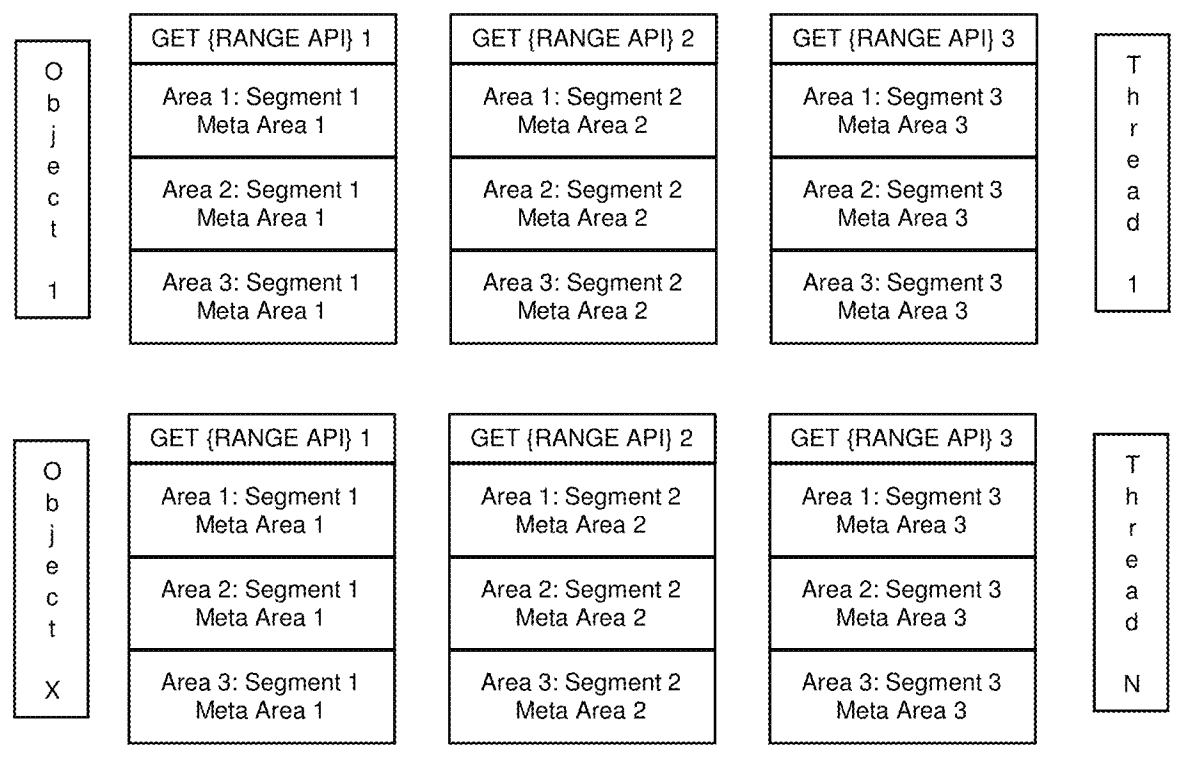

FIG. 5 is a diagram illustrating an example metadata processing technique, according to one embodiment of the present disclosure. In this embodiment, the metadata of object 1 is processed using thread 1, and the metadata of object X is processed using thread N. This example embodiment shows three Range GET commands, although one skilled in the art would recognize that as many commands can be performed as needed in order to detect a corruption, or process all of the segments within each area. In this embodiment, each object is divided into three areas, and each GET command can retrieve the metadata from one segment of each area. In the first GET command, thread 1 processes the metadata from the first segment of each of the three areas in object 1; while thread N processes the metadata from the first segment of each of the three areas in object X. In the second GET command, thread 1 processes the metadata from the second segment of each of the three areas in object 1; while thread N processes the metadata from the second segment of each of the three areas in object X. Likewise, in the third GET command, thread 1 processes the metadata from the third segment of each of the three areas in object 1; while thread N processes the metadata from the third segment of each of the three areas in object X. This can continue until a corruption is detected, or until all the metadata from all of the segments within the objects are processed.

Figure 6:
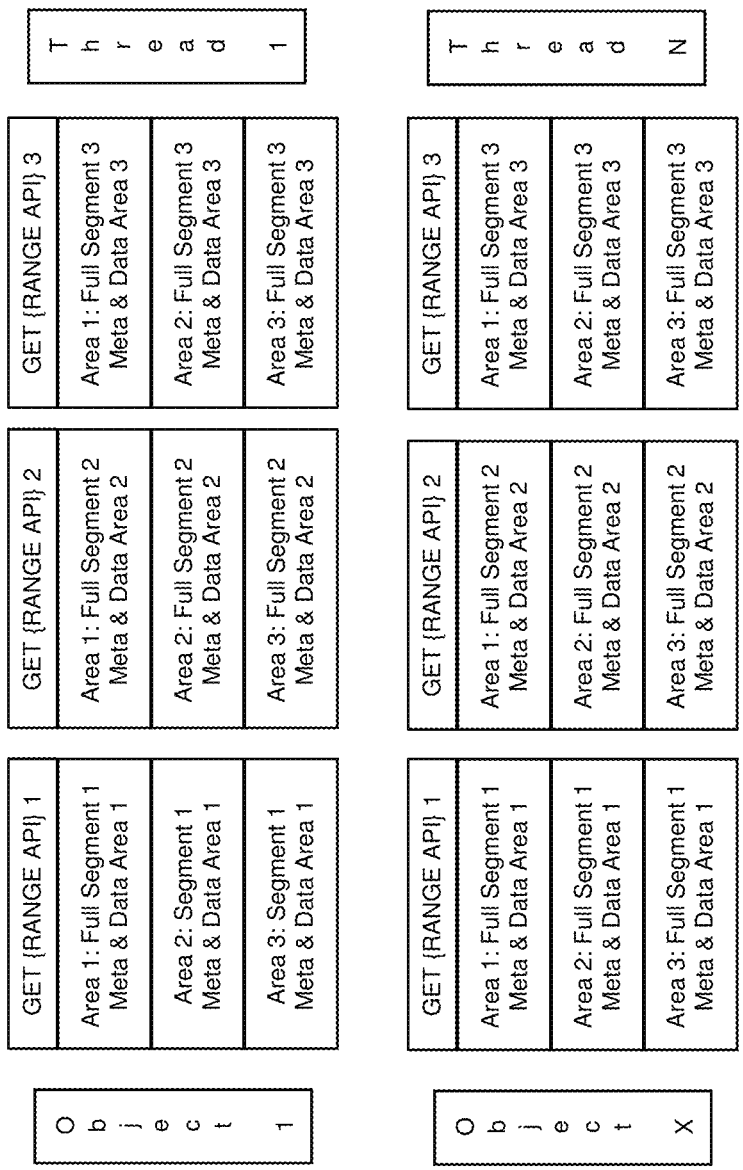
FIG. 6 is a diagram illustrating an example data processing technique, according to an embodiment.

FIG. 6 is a diagram illustrating an example data processing technique, according to one embodiment of the present disclosure. In this embodiment, the data (all data, not just the metadata as in FIG. 5) of object 1 is processed using thread 1, and the data of object X is processed using thread N. This example embodiment shows three Range GET commands, although one skilled in the art would recognize that as many commands can be performed as needed in order to detect a corruption, or process all of the segments within each area. In this embodiment, each object is divided into three areas, and each GET command can retrieve the data from one segment of each area. In the first GET command, thread 1 processes the data from the first segment of each of the three areas in object 1; while thread N processes the data from the first segment of each of the three areas in object X. In the second GET command, thread 1 processes the data from the second segment of each of the three areas in object 1; while thread N processes the data from the second segment of each of the three areas in object X. Likewise, in the third GET command, thread 1 processes the data from the third segment of each of the three areas in object 1; while thread N processes the data from the third segment of each of the three areas in object X. This can continue until a corruption is detected, or until all the data from all of the segments within the objects are processes.

The above methods can be deployed in various ways as a complete cloud data integrity solution for any dedupe application. In some embodiments, both the fast and progressive methods can be executed manually as and when needed. In some embodiments, the fast metadata processing method (e.g., FIG. 2) can be executed independently as a lightweight utility, which can run periodically, to quickly scan billions of deduped cloud objects to detect corruptions. In some cases, if a corruption is detected, this could signal that more objects might be bad and can trigger the execution of the deeper second layer analysis (e.g., FIG. 3).

In some embodiments, the techniques disclosed herein can run as a Lambda Service as well. Many public cloud providers support lambda services to be executed within the cloud. For such public cloud providers, the methods in this disclosure can be executed as Lambda services and can provide multiple benefits, such as: S3 data egress charges will not be there since no I/O would happen to outside the cloud; and reading and processing over the cloud objects will be much faster due to the reduction in number of hops/latency for the read operations.

In some embodiments, converting the above methods to run as a lambda service may include placing/realigning the fast and progressive methods under a controller method. The controller method can run locally, and the fast and progressive methods can execute as lambda services/functions. In one such embodiment, the processor or controller can: read the local metadata and create the i/o tuples; invoke the fast method's (metadata analysis) lambda function in the cloud; receive the results from the fast method; again read the local metadata and create the progressive method's i/o tuples; invoke the progressive method's (full data analysis) lambda function in the cloud; receive the results from the progressive method; process the results, log them, display them and perform all other such activities.

In another embodiment, the processor or controller can also be made to run as a lambda service, where it can read the metadata copy stored in the cloud itself. This would be a model where the whole process runs as a lambda service in the cloud. In one embodiment, such a method can be executed as an online service in a dedupe system, which can scan the cloud objects periodically and automatically, using the fast method, based on various system factors, such as when any cloud related error messages are detected in the DDR system logs (a set of well-defined error messages specific to the dedupe system can be fed to this service). The service can continue monitoring the logs continuously and if any such error messages are seen, then it can pro-actively trigger the fast method and provide a report to the administrators for further action. In some embodiments, an administrator can set pre-configured intervals for executing the methods disclosed herein. For example, the scanning methods can execute only when the dedupe system is lightly loaded, or if a lesser number of backups are happening, etc. The methods disclosed herein can also be triggered or managed via a dedupe systems CLIs and GUI as well, providing full control to the user to check the integrity and/or progress of data moved to the cloud. In some embodiments, automated recovery methods like scavenge (recovery of segments from available duplicates in the cloud or on-prem of the dedupe system), etc. can be attached to the methods so that corrective measures are automatically taken as and when corruptions are detected.

The methods and systems disclosed herein divide the traditional scanning approach into two efficient layers, with the primary objective to detect corruption in an object, as early as possible. This method also avoids reading the whole object to minimize cloud egress cost and yet detect corruption. In some embodiments, intelligent selective reading of certain areas of the cloud object can detect corruptions by reading only parts of the object, and not the full object most of the times. This can reduce the overall time and cost for corruption detection as compared to the traditional techniques. For example, with traditional approach for 1 PB of cloud objects, it would take many months to detect corruptions. With this new method, it would take much less time (via the fast method) along with least possible cloud i/o to detect most of the possible corruptions.

Examples of corruptions that can be detected include: full object corruptions like completely zeroed out or completely filled with random/garbage data; partially zeroed out objects or chunks of zeroed out areas within objects; partially corrupted objects with random garbage data; lost/missing objects. In some embodiments, for deep rooted corruptions like corrupted bytes in the encrypted, compressed data area, the progressive method can detect it at a much less time and drastically reduced amount of cloud I/O, in spite of reading whole segments. There might be an increase in the number of cloud transactions, which can increase the execution time in instances where no corrupt objects are found. However, this should be very less and negligible when compared to the possible gains from the reduction in total I/O done.

Figure 7:
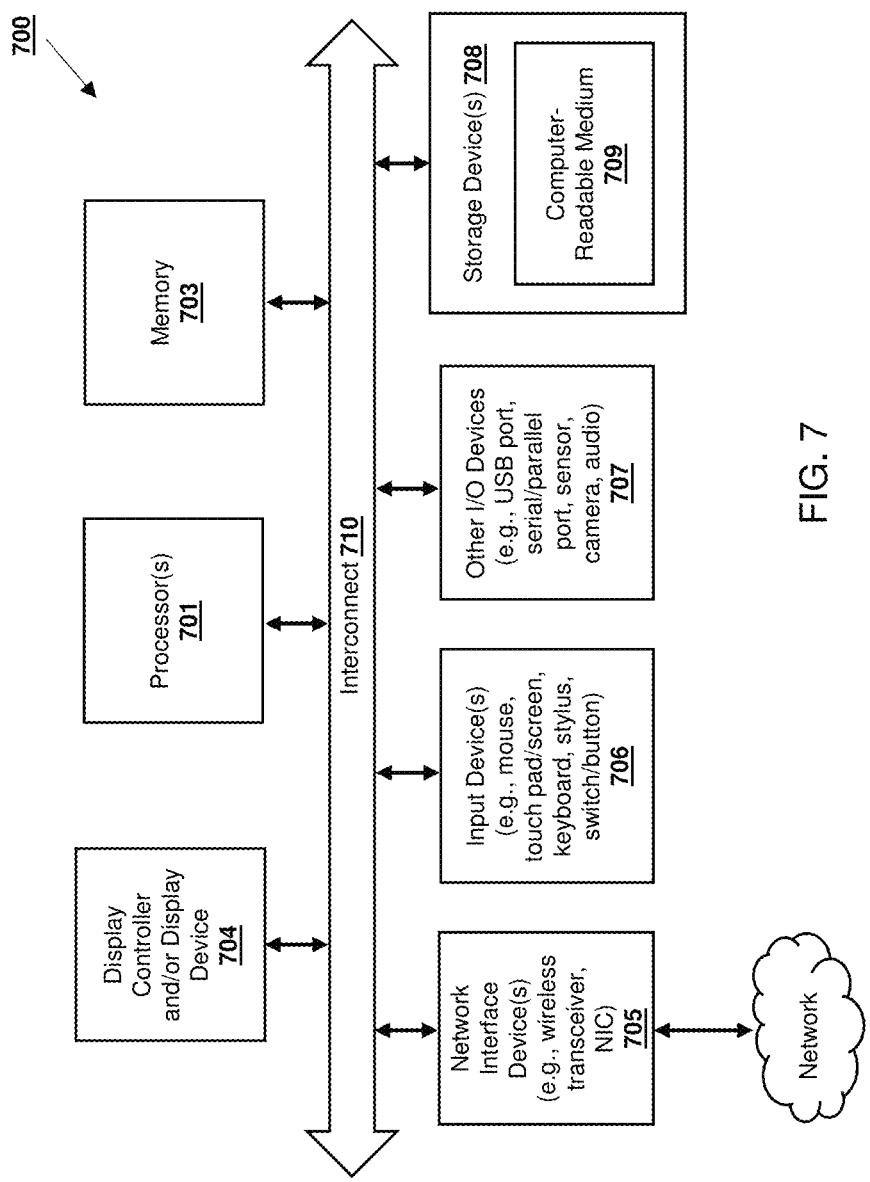
FIG. 7 is a block diagram illustrating an example of a data processing system that may be used with embodiments described herein.

FIG. 7 is a block diagram illustrating an example of a data processing system 700 that may be used with embodiments described herein. The data processing system 700 may represent any of the data processing systems described above and may perform any of the processes or methods described above. The data processing system 700 can include many different components. These components can be implemented as integrated circuits (ICs), discrete electronic devices, or other modules adapted to a circuit board such as a motherboard or add-in card of the computer system, or as components otherwise incorporated within a chassis of the computer system. Note also that the data processing system 700 is intended to show a high-level view of many components of the computer system. However, it is to be understood that additional components may be present in certain implementations and furthermore, different arrangement of the components shown may occur in other implementations. The data processing system 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment the data processing system 700 includes one or more processor(s) 701, memory 703, network interface devices 705, I/O devices 706, 707 and storage device(s) 708 connected via a bus or an interconnect 710. The one or more processor(s) 701 may be a single processor or multiple processors with a single processor core or multiple processor cores included therein. The processor(s) 701 may represent one or more general-purpose processors such as a microprocessor, a central processing unit (CPU), or the like. More particularly, the processor(s) 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor(s) 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor(s) 701 may be a low power multi-core processor, such as an ultra-low voltage processor, and may act as a main processing unit and central hub for communication with the various components of the system. Such processor can be implemented as a system on chip (SoC). The processor(s) 701 are configured to execute instructions for performing the operations and steps discussed herein. The data processing system 700 may further include a graphics/display subsystem 704, which may include a display controller, a graphics processor, and/or a display device. In one embodiment at least a portion of the graphics/display subsystem 704 is integrated into the processors(s) 701. The graphics/display subsystem 704 is optional and some embodiments may not include one or more components of the graphics/display subsystem 704.

The processor(s) 701 communicates with memory 703, which in one embodiment can be implemented via multiple memory devices to provide for a given amount of system memory. The memory 703 may include one or more volatile storage (or memory) devices such as random access memory (RAM), dynamic RAM (DRAM), synchronous DRAM (SDRAM), static RAM (SRAM), or other types of storage devices. The memory 703 may store information including sequences of instructions that are executed by the one or more processor(s) 701 or any other device. For example, executable code and/or data of a variety of operating systems, device drivers, firmware (e.g., input output basic system or BIOS), and/or applications can be loaded in the memory 703 and executed by one of the processor(s) 701. The operating system can be any kind of operating system such as, for example, Windows® operating system from Microsoft®, Mac OS®/iOS® from Apple, Android® from Google®, Linux®, Unix®, or other real-time or embedded operating systems such as VxWorks.

The data processing system 700 may further include I/O devices such as a network interface device(s) 705, input device(s) 706, and other I/O device(s) 707. Some of the input device(s) 706 and other I/O device(s) 707 may be optional and are excluded in some embodiments. The network interface device(s) 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

The input device(s) 706 may include a mouse, a touch pad, a touch sensitive screen (which may be integrated with a display device of the graphics/display subsystem 704), a pointer device such as a stylus, and/or a keyboard (e.g., physical keyboard or a virtual keyboard displayed as part of a touch sensitive screen). For example, the input device(s) 706 may include a touch screen controller coupled to a touch screen. The touch screen and touch screen controller can, for example, detect contact and movement or a break thereof using any of a number of touch sensitivity technologies, including but not limited to capacitive, resistive, infrared, and surface acoustic wave technologies, as well as other proximity sensor arrays or other elements for determining one or more points of contact with the touch screen.

The other I/O device(s) 707 may also include an audio device. An audio device may include a speaker and/or a microphone to facilitate voice-enabled functions, such as voice recognition, voice replication, digital recording, and/or telephony functions. The other I/O device(s) 707 may also include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The other I/O device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of data processing system 700.

To provide for persistent storage of information such as data, applications, one or more operating systems and so forth, a mass storage (not shown) may also couple to the processor(s) 701. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of flash based storage to act as an SSD cache to enable non-volatile storage of context state and other such information during power down events so that a fast power up can occur on re-initiation of system activities. In addition, a flash device may be coupled to the processor(s) 701, e.g., via a serial peripheral interface (SPI). This flash device may provide for non-volatile storage of system software, including a basic input/output software (BIOS) as well as other firmware of the system.

The storage device(s) 708 may include computer-readable storage medium 709 (also known as a machine-readable storage medium) on which is stored one or more sets of instructions or software embodying any one or more of the methodologies or functions described herein. The computer-readable storage medium 709 may also be used to store the same software functionalities described above persistently. While the computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while the data processing system 700 is illustrated with various components of a data processing system, it is not intended to represent any particular architecture or manner of interconnecting the components; as such, details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

According to one aspect of the present disclosure, a computer implemented method of detecting object corruption is disclosed. The method includes: a) determining an offset and size of a meta area within each segment in an object, wherein each object is a deduplicated cloud object; b) dividing metadata of each deduplicated cloud object into a number of equally spaced areas; c) processing metadata from a first segment from each equally spaced area to detect corruption of metadata; d) labeling the deduplicated cloud object as corrupted if corruption of metadata is detected in metadata from the first segment; e) processing metadata from a subsequent segment from each equally spaced area to detect corruption of metadata; f) labeling the deduplicated cloud object as corrupted if corruption of metadata is detected in metadata from the subsequent segment; and g) repeating operations e)-f) if no corruption is yet detected and not all metadata from all segments of the deduplicated cloud object has been processed. In some embodiments, determining an offset and size of a meta area within each segment includes generating a series of I/O tuples, each I/O tuple including at least one of: an object ID, segment offset, segment length, meta area start offset, and meta area end offset. In some embodiments, the method can be performed on a number of deduplicated cloud objects, and metadata from segments of each deduplicated cloud object are processed by a single thread. In some embodiments, processing metadata is performed using a Range GET command to read a range of bytes instead of a full object length. In some embodiments, the method is performed on a number of deduplicated cloud objects, and the method also includes: h) generating a list of deduplicated cloud objects not identified as corrupt based on metadata processing; i) dividing data of each deduplicated cloud object not identified as corrupt based on metadata processing into a number of equally spaced data areas; j) processing data from a first segment from each equally spaced data area to detect data corruption; k) labeling the deduplicated cloud object as corrupted if corruption of data is detected; l) processing data from a subsequent segment from each equally spaced data area to detect data corruption; m) labeling the deduplicated cloud object as corrupted if corruption of data is detected; and n) repeating operations l)-m) if no corruption is yet detected and not all data from all segments of the deduplicated cloud object has been processed. In some embodiments, data from segments of each deduplicated cloud object are processed by a single thread.

Another aspect of the present disclosure includes a system for detecting object corruption. The system includes a deduplicated storage system storing deduplicated cloud objects in a particular layout; and a processor including a metadata corruption detection module configured to: a) determine an offset and size of a meta area within each segment in the deduplicated cloud objects; b) divide metadata of each deduplicated cloud object into a number of equally spaced areas; c) process metadata from a first segment from each equally spaced area to detect corruption of metadata; d) label a deduplicated cloud object as corrupted if corruption of metadata is detected in metadata from the first segment; e) process metadata from a subsequent segment from each equally spaced area to detect corruption of metadata; f) label the deduplicated cloud object as corrupted if corruption of metadata is detected in metadata from the subsequent segment; and g) repeat operations e)-f) if no corruption is yet detected and not all metadata from all segments of the deduplicated cloud object has been processed. In some embodiments, determining an offset and size of a meta area within each segment includes generating a series of I/O tuples, each I/O tuple including at least one of: an object ID, segment offset, segment length, meta area start offset, and meta area end offset. In some embodiments, metadata from segments of each deduplicated cloud object are processed by a single thread. In some embodiments, processing metadata is performed using a Range GET command to read a range of bytes instead of a full object length. In some embodiments, the processor also includes a data corruption detection module configured to: h) generate a list of deduplicated cloud objects not identified as corrupt based on metadata processing; i) divide data of each deduplicated cloud object not identified as corrupt based on metadata processing into a number of equally spaced data areas; j) process data from a first segment from each equally spaced data area to detect data corruption; k) label the deduplicated cloud object as corrupted if corruption of data is detected; l) process data from a subsequent segment from each equally spaced data area to detect data corruption; m) label the deduplicated cloud object as corrupted if corruption of data is detected; and n) repeat operations l)-m) if no corruption is yet detected and not all data from all segments of the deduplicated cloud object has been processed. In some embodiments, data from segments of each deduplicated cloud object are processed by a single thread.

Another aspect of the present disclosure includes a non-transitory computer-readable medium storing instructions which, when executed by one or more processors, cause the one or more processors to perform a method of detecting object corruption. The method includes: a) determine an offset and size of a meta area within each segment in an object, wherein each object is a deduplicated cloud object; b) divide metadata of each deduplicated cloud object into a number of equally spaced areas; c) process metadata from a first segment from each equally spaced area to detect corruption of metadata; d) label the deduplicated cloud object as corrupted if corruption of metadata is detected in metadata from the first segment; e) process metadata from a subsequent segment from each equally spaced area to detect corruption of metadata; f) label the deduplicated cloud object as corrupted if corruption of metadata is detected in metadata from the subsequent segment; and g) repeat operations e)-f) if no corruption is yet detected and not all metadata from all segments of the deduplicated cloud object has been processed. In some embodiments, determining an offset and size of a meta area within each segment includes generating a series of I/O tuples, each I/O tuple including at least one of: an object ID, segment offset, segment length, meta area start offset, and meta area end offset. In some embodiments, the method can be performed on a number of deduplicated cloud objects, and metadata from segments of each deduplicated cloud object are processed by a single thread. In some embodiments, processing metadata is performed using a Range GET command to read a range of bytes instead of a full object length. In some embodiments, the method is performed on a number of deduplicated cloud objects, the method also includes: h) generating a list of deduplicated cloud objects not identified as corrupt based on metadata processing; i) dividing data of each deduplicated cloud object not identified as corrupt based on metadata processing into a number of equally spaced data areas; j) processing data from a first segment from each equally spaced data area to detect data corruption; k) labeling the deduplicated cloud object as corrupted if corruption of data is detected; l) processing data from a subsequent segment from each equally spaced data area to detect data corruption; m) labeling the deduplicated cloud object as corrupted if corruption of data is detected; and n) repeating operations l)-m) if no corruption is yet detected and not all data from all segments of the deduplicated cloud object has been processed. In some embodiments, data from segments of each deduplicated cloud object are processed by a single thread.

In the foregoing specification, the invention has been described with reference to specific embodiments thereof. However, various modifications and changes can be made thereto without departing from the broader spirit and scope of the invention. The specification and drawings are, accordingly, to be regarded in an illustrative rather than a restrictive sense.

What is claimed is:

1. A computer implemented method of detecting object corruption, the method comprising:
   determining an offset and size of a meta area within each segment in a plurality of segments included in a deduplicated cloud object comprising data, wherein determining the offset and the size of the meta area within each segment in the plurality of segments includes generating a plurality of I/O tuples corresponding to the plurality of segments;
   dividing the plurality of segments and metadata corresponding to the deduplicated cloud object into a plurality of areas using the plurality of I/O tuples;
   processing first metadata in a first set of segments, wherein the first set of segments are first segments in each of the plurality of areas;
   determining that the metadata of the deduplicated cloud object is uncorrupted in response to processing the first metadata; and
   in response to determining that the metadata of the deduplicated cloud object is uncorrupted, the method further comprises:
      dividing the data of the deduplicated cloud object into a plurality of data areas;
      processing first data from a first set of data segments, wherein the first set of data segments includes first segments from each one of the plurality of data areas;
      determining that the data of the deduplicated cloud object is corrupted in response to processing the first data; and
      labeling the deduplicated cloud object as corrupted in response to determining that the data of the deduplicated cloud object is corrupted.

2. The computer implemented method of claim 1, wherein each one of the plurality of I/O tuples includes at least one of: an object ID, segment offset, segment length, meta area start offset, and meta area end offset.

3. The computer implemented method of claim 1, wherein the method is performed on a plurality of deduplicated cloud objects, and metadata from all segments of each deduplicated cloud object are processed by a single thread.

4. The computer implemented method of claim 1, wherein processing the metadata is performed using a Range GET command to read a range of bytes instead of a full object length.

5. The computer implemented method of claim 1, wherein the method is performed on a plurality of deduplicated cloud objects, the method further comprising:
   generating a list of deduplicated cloud objects not identified as corrupt based on metadata processing;
   dividing the data of each deduplicated cloud object not identified as corrupt based on the metadata processing into the plurality of data areas;
   processing second data from a second set of data segments subsequent to the first set of data segments to detect data corruption in response to determining that the data corruption is not detected in the first data, wherein the second set of data segments includes second segments from each data area;
   labeling the deduplicated cloud object as corrupted in response to determining that corruption of the data is detected in the second data from one of the second set of data segments from each data area; and
   wherein processing next data in a next set of data segments subsequent to the second set of data segments is performed in response to determining that corruption of the data is not detected in the second data and until the data corruption is detected or all the data from all segments of the deduplicated cloud object has been processed.

6. The computer implemented method of claim 5, wherein the data from all segments of each deduplicated cloud object is processed by a single thread.

7. The computer implemented method of claim 5, wherein the metadata of each deduplicated cloud object is divided into equally spaced areas, and the data of each deduplicated cloud object not identified as corrupt based on the metadata processing is divided into equally spaced data areas.

8. A system for detecting object corruption comprising:
   a deduplicated storage system storing deduplicated cloud objects in a particular layout; and
   a processor including a metadata corruption detection module configured to:
      determine an offset and size of a meta area within each segment in a plurality of segments included in one of the deduplicated cloud objects comprising data, wherein determining the offset and the size of the meta area within each segment in the plurality of segments includes generating a plurality of I/O tuples corresponding to the plurality of segments;
      divide the plurality of segments and metadata corresponding to the deduplicated cloud object into a plurality of areas using the plurality of I/O tuples;
      process first metadata in a first set of segments, wherein the first set of segments are first segments in each of the plurality of areas;
      determine that the metadata of the deduplicated cloud object is uncorrupted in response to processing the first metadata; and
      in response to determining that the metadata of the deduplicated cloud object is uncorrupted, the processor is further configured to:
         divide the data of the deduplicated cloud object into a plurality of data areas;
         process first data from a first set of data segments, wherein the first set of data segments includes first segments from each one of the plurality of data areas;
         determine that the data of the deduplicated cloud object is corrupted in response to processing the first data; and
         label the deduplicated cloud object as corrupted in response to determining that the data of the deduplicated cloud object is corrupted.

9. The system as in claim 8, wherein, each one of the plurality of I/O tuples includes at least one of: an object ID, segment offset, segment length, meta area start offset, and meta area end offset.

10. The system as in claim 8, wherein the metadata from all segments of each deduplicated cloud object are processed by a single thread.

11. The system as in claim 8, wherein processing the metadata is performed using a Range GET command to read a range of bytes instead of a full object length.

12. The system as in claim 8, wherein the processor further includes a data corruption detection module configured to:
   generate a list of deduplicated cloud objects not identified as corrupt based on metadata processing;
   divide the data of each deduplicated cloud object not identified as corrupt based on the metadata processing into the plurality of data areas;

process second data from a second set of data segments subsequent to the first set of data segments to detect data corruption in response to determining that the data corruption is not detected in the first data, wherein the second set of data segments includes second segments from each data area;

label the deduplicated cloud object as corrupted in response to determining that corruption of the data is detected in the second data from one of the second set of data segments from each data area; and wherein processing next data in a next set of data segments subsequent to the second set of data segments is performed in response to determining that corruption of the data is not detected in the second data and until corruption of the data is detected or all the data from all segments of the deduplicated cloud object has been processed.

13. The system as in claim 12, wherein the data from all segments of each deduplicated cloud object is processed by a single thread.

14. The system as in claim 12, wherein the metadata of each deduplicated cloud object is divided into equally spaced areas, and the data of each deduplicated cloud object not identified as corrupt based on the metadata processing is divided into equally spaced data areas.

15. A non-transitory computer-readable medium storing instructions which, when executed by one or more processors, cause the one or more processors to perform a method of detecting object corruption, the method comprising:

determining an offset and size of a meta area within each segment in a plurality of segments included in a deduplicated cloud object comprising data, wherein determining the offset and the size of the meta area within each segment in the plurality of segments includes generating a plurality of I/O tuples corresponding to the plurality of segments;

dividing the plurality of segments and metadata corresponding to the deduplicated cloud object into a plurality of areas using the plurality of I/O tuples;

processing first metadata in a first set of segments, wherein the first set of segments are first segments in each of the plurality of areas;

determining that the metadata of the deduplicated cloud object is uncorrupted in response to processing the first metadata; and in response to determining that the metadata of the deduplicated cloud object is uncorrupted, the method further comprises:

dividing the data of the deduplicated cloud object into a plurality of data areas;

processing first data from a first set of data segments, wherein the first set of data segments includes first segments from each one of the plurality of data areas;

determining that the data of the deduplicated cloud object is corrupted in response to processing the first data; and labeling the deduplicated cloud object as corrupted in response to determining that the data of the deduplicated cloud object is corrupted.

16. The non-transitory computer-readable medium as in claim 15, wherein each one of the plurality of I/O tuples includes at least one of: an object ID, segment offset, segment length, meta area start offset, and meta area end offset.

17. The non-transitory computer-readable medium as in claim 15, wherein the method is performed on a plurality of deduplicated cloud objects, and metadata from all segments of each deduplicated cloud object are processed by a single thread.

18. The non-transitory computer-readable medium as in claim 15, wherein processing the metadata is performed using a Range GET command to read a range of bytes instead of a full object length.

19. The non-transitory computer-readable medium as in claim 15, wherein the method is performed on a plurality of deduplicated cloud objects, the method further comprising:

generating a list of deduplicated cloud objects not identified as corrupt based on metadata processing;

dividing the data of each deduplicated cloud object not identified as corrupt based on the metadata processing into the plurality of data areas;

processing second data from a second set of data segments subsequent to the first set of data segments to detect data corruption in response to determining that the data corruption is not detected in the first data, wherein the second set of segments includes second segments from each data area;

labeling the deduplicated cloud object as corrupted in response to determining that corruption of the data is detected in the second data from one of the second set of data segments from each data area; and wherein processing next data in a next set of data segments subsequent to the second set of data segments is performed in response to determining that corruption of the data is not detected in the second data and until the data corruption is detected or all the data from all segments of the deduplicated cloud object has been processed.

20. The non-transitory computer-readable medium as in claim 19, wherein the data from all segments of each deduplicated cloud object is processed by a single thread.

* * * * *